Figure 2:
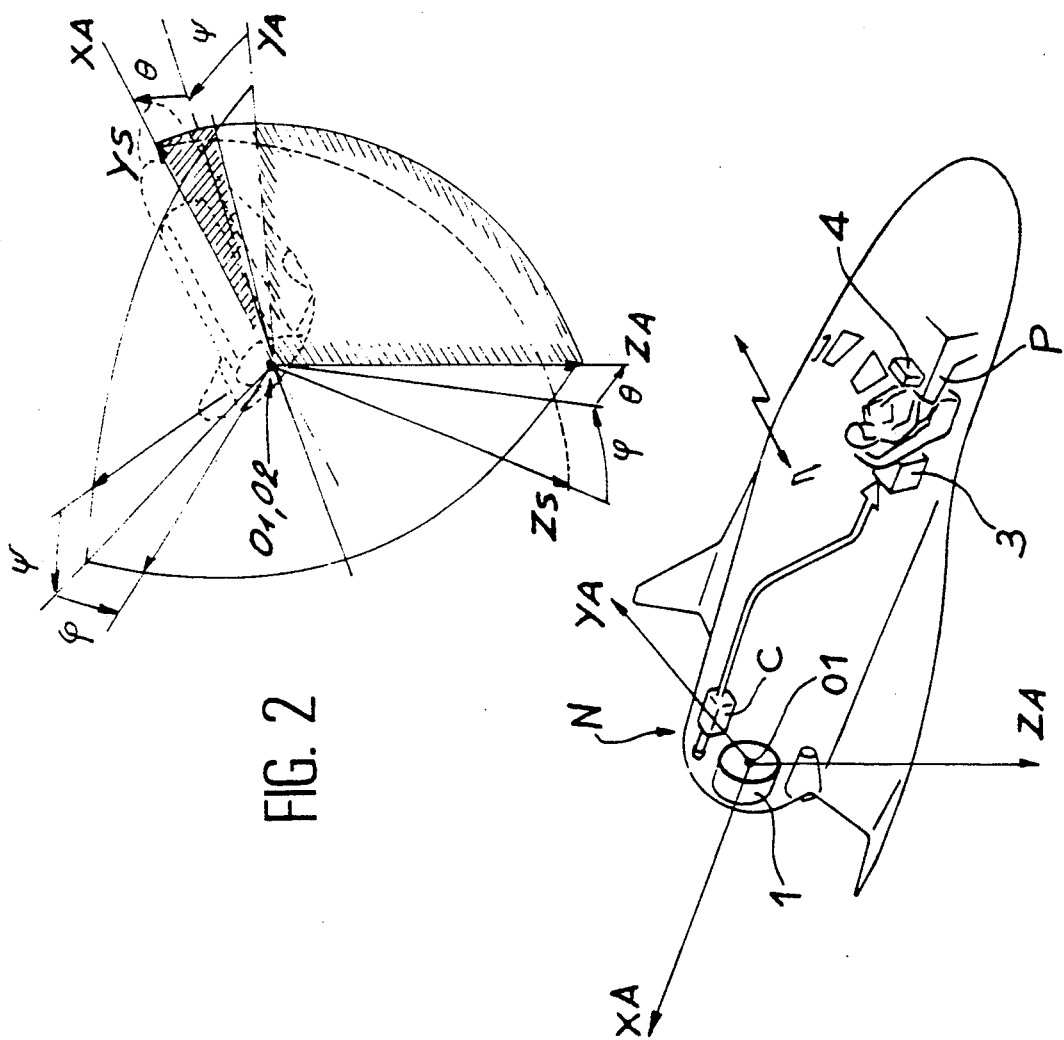

United States Patent [19]

Ferro

[11] Patent Number: 5,119,305
[45] Date of Patent: Jun. 2, 1992

[54] PROCESS AND SYSTEM FOR REMOTELY CONTROLLING AN ASSEMBLY OF A FIRST AND A SECOND OBJECT

[75] Inventor: Daniel V. Ferro, Toulouse, France

[73] Assignee: Aerospatiale Societe Nationale Indust., Paris, France

[21] Appl. No.: 581,809

[22] Filed: Sep. 13, 1990

[30] Foreign Application Priority Data

Sep. 14, 1989 [FR] France ................... 89 12036

[51] Int. Cl.$^5$ ............................................. B64G 1/64
[52] U.S. Cl. .................................... 364/460; 364/559; 244/161
[58] Field of Search ............ 364/460, 461, 559; 244/160, 161, 164, 171, 162; 356/150

[56] References Cited

U.S. PATENT DOCUMENTS

| | | | |
|---|---|---|---|
| 3,910,533 | 10/1975 | Cheathim et al. | 244/161 |
| 4,203,132 | 5/1980 | Schmitt et al. | 358/101 |
| 4,753,569 | 6/1988 | Pryor | 414/730 |
| 4,834,531 | 5/1989 | Ward | 356/5 |
| 4,851,905 | 7/1989 | Pryor | 358/125 |
| 4,890,918 | 1/1990 | Monford | 356/150 |

FOREIGN PATENT DOCUMENTS 626993 12/1981 Switzerland .

OTHER PUBLICATIONS

Lee, Jiann-Der et al., Proceedings Tencon 87, IEEE Region 10 Conference, vol. 2 of 3, pp. 555-599 (1987).
R. C. Luo et al., Proceedings 1988 IEEE, Int'l Conference on Robotics and Automation, vol. 1, pp. 568-573 (1988).

Primary Examiner—Parshotam S. Lall
Assistant Examiner—Collin W. Park
Attorney, Agent, or Firm—Michael N. Meller

[57] ABSTRACT

A process and a system for remotely controlling the assembly of two objects are provided. Display takes place on a display screen (4) linked with the first object (such as a space vehicle) of at least the instantaneous values of the deviations (X, Y, Z) and the cardan angles ($\phi, \theta, \psi$) between said vehicle and the second object (such as an orbiting station). The display also includes a first polygon (PN) representing a fictional contour of a docking or assembly part of the vehicle, a second polygon (PS1), identical to the first, representing a functional contour of a docking or assembly part (2) of the station and oriented and positioned in the first polygon in accordance with the orientation of the station relative to the vehicle. The display also includes a third polygon (PS2) within the second polygon and having the same orientation, but positioned therein in accordance with the deviations Y and Z. The superimposing of the first and second polygons (PN, PS1) and the centering of the third polygon (PS2) in the second polygon (PS1) indicates the good relative positioning of the vehicle and the station for assembly purposes.

16 Claims, 3 Drawing Sheets

PROCESS AND SYSTEM FOR REMOTELY CONTROLLING AN ASSEMBLY OF A FIRST AND A SECOND OBJECT

The present invention relates to a process and a system for remotely checking the assembly of a first and a second object.

It more particularly applies to the remote control of the assembly of an assembly or docking part of a space vehicle and an assembly or docking part of an orbiting space station. The assembly of the docking parts of the space vehicle and the space station being carried out by the control of the relative displacement of the space vehicle with respect to the station, the vehicle pilot not having direct vision of the assembly part of the vehicle and the assembly part of the station. The control consists of displaying essential parameters of the displacements permitting the assembly, as well as fictional images of the assembly or docking parts.

The invention is also applicable to robotics, when it is a question of assembling two objects, one of them being carried by a mobile arm of a robot. The invention essentially relates to the display of essential parameters making it possible to remotely control the assembly of a first and a second object. The assembly of such objects being carried out by control of a relative displacement of said first object with respect to said second object and by the display of fictional images respectively corresponding to the parts of said two objects which are to be assembled.

Particularly in the robotics and astronautical fields, it is known to be very difficult to remotely control the assembly of a first and a second object by the control of the relative displacement of the first object with respect to the second. This control is very difficult when the person responsible for carrying it out has to act on the controls necessary for the displacements permitting the assembly without having direct vision of the respective portions of the two objects which are to be assembled.

In general, in order to carry out such a control, the existing processes and systems use one or more television cameras giving direct images or pictures of the portions of the two objects to be assembled. However, such existing systems and processes fail to give information on essential parameters of the displacements of the first object relative to the second and do not make it possible to effectively and accurately act on the controls of said displacements.

The invention specifically aims at obviating these disadvantages and at providing a process and a system making it possible to accurately and effectively remotely control the assembly of a first and a second object, said assembly being carried out by the control of a relative displacement of said first object with respect to said second object, without the person responsible for the assembly having direct vision of said two objects or a real picture thereof.

These aims are in particular achieved by the present invention through the display of the main parameters relating to the relative displacement of the first object relative to the second, as well as the display of fictional images of the respective portions of the two objects to be assembled in a plane of a three axes reference linked with the first object.

The present invention relates to a process for remotely controlling the assembly of a first object and a second object, said assembly being carried out by the control of a relative displacement of the first object relative to the second, said displacement being an approach movement by translation of the first object in the direction of the second and/or a lateral translation movement of the first object with respect to the second and/or a rotary movement of the first object relative to the second, said objects being respectively first and second assembly or docking parts, said process being characterized in that it comprises:

defining a first and a second three axes reference linked respectively with the first and second objects, each reference being defined by an origin and three orthogonal axes;

determining in the first reference during said relative displacement, instantaneous deviation values (X, Y, Z) between the origin ($O_2$) of the second reference and the origin ($O_1$) of the first reference and instantaneous values of cardan or gimbal angles, called roll, pitch and yaw angles, of the axes of the second reference with respect to the corresponding axes of the first reference;

processing said instantaneous values in order to display, on a display support linked with the first object, the instantaneous values of the deviations and the cardan angles, and at least one first polygon fixed to said support, representing a fictional contour of said first assembly part, a second polygon mobile on said support, representing a fictional contour of said second assembly part, said two polygons having the same shape and a similar size and the second polygon having an instantaneous position and orientation dependent on the corresponding instantaneous values of the cardan angles of the second object relative to the first object, and a third polygon inside and homothetic of the second polygon and of the same orientation as said second polygon, said third polygon being mobile within the second polygon and occupying a position dependent on the lateral deviations of the second object relative to the first object;

on the basis of said display, acting on the control of said relative displacement in order to bring about coincidence between the first and second polygons and in order to center the third polygon in the second polygon, up to a zero value of said distance.

According to another feature of the process, the latter also consisting as a result of the processing of the instantaneous values of the cardan angles ($\psi$, $\theta$, $\phi$), of displaying on said display support instantaneous values ($\psi'$, $\theta'$, $\psi'$) of the variation speeds of the cardan angles during the displacement.

According to another feature, the process also consists, as a result of the processing of the instantaneous values of the deviations, displaying on said display support instantaneous values of the approach speeds (X') of said first object with said second object.

According to another feature, the process also consists of respectively displaying by mobile cursors in fixed scales, the evolutions of the instantaneous values of the transverse deviations and, by distinctive signs or symbols, evolution predictions of said deviations in a given direction.

According to another feature, the process consists of respectively displaying the speed variation values of the cardan angles in the mobile cursors relative to fixed scales.

According to another feature, the process consists of displaying the instantaneous values of the approach speeds in a fixed cursor with respect to a moving value scale and displaying the prediction of the increase or decrease in said speeds by a distinctive fixed sign or symbol.

The invention also relates to a system for the remote control of the assembly of a first object to a second, said assembly being carried out by the control of a relative displacement of the first object relative to the second, said displacement being an approach movement of the first object in the direction of the second and/or a lateral translation movement of the first object relative to the second and/or a rotary movement of the first object relative to the second, said objects respectively having a first and a second assembly or docking parts, characterized in that said system comprises:

measuring means for supplying in a first three axes reference linked with the first object, during the displacement, signals representing the instantaneous values of deviations between the origin of the first reference linked with the first object and the origin of a second reference linked with the second object, and instantaneous values of cardan or gimbal angles, called roll, pitch and yaw angles, respectively between the axes of the second reference and the corresponding axes of the first reference, each reference being defined by an origin and three orthogonal axes, the representative signals of the instantaneous values being supplied on outputs of the measuring means;

a computer connected to a memory and to the outputs of the measuring means for processing the representative signals of the instantaneous values in order to obtain said instantaneous values and to permit said check of the movement of the first object relative to the second;

display means connected to the control outputs of the computer for displaying during the displacement, on the display support at least instantaneous values of the deviations and the cardan angles, instantaneous values of the speed variations of the cardan angles, instantaneous values of the approach speeds, and for displaying at least one fixed polygon on the support representing a fictional contour of said first assembly part, a second polygon, mobile on the support, representing a fictional contour of said second assembly part, these two polygons having the same shape and size and the second polygon having an instantaneous position and orientation dependent on the corresponding instantaneous values of the cardan angles of the second object relative to the first, and a third polygon, inside and homothetic of the second polygon and having the same orientation as said second polygon, said third polygon being mobile within the second polygon and occupying a position dependent on lateral deviations of the second object relative to the first, said display making it possible to remotely check the displacement of the first object relative to the second in order to act as a consequence thereof on the displacement control of the first object relative to the second.

According to another feature, the measuring means incorporate a characteristic target integral with the second object, a means integral with the first object supplying on outputs, signals representing the image of the target, cardan angle and distance deviations in the first reference.

According to another feature, the means for obtaining said representative signals are constituted by a video camera supplying said signals on outputs.

According to another feature, the display means are screen means, the image of the target being superimposed on the screen with said first, second and third polygons.

According to another feature, the screen display means are display control means in different colours.

According to another feature, the first object is integral with an arm of a robot, the system being used for controlling the assembly of the first part of the first object and the second part of the second object.

According to another feature, the first part of the first object is an assembly or docking part of a space vehicle, the second part of the second object being an assembly or docking part of an orbiting space station, the system being used for checking the space rendez-vous between the vehicle and the station.

Figure 1:
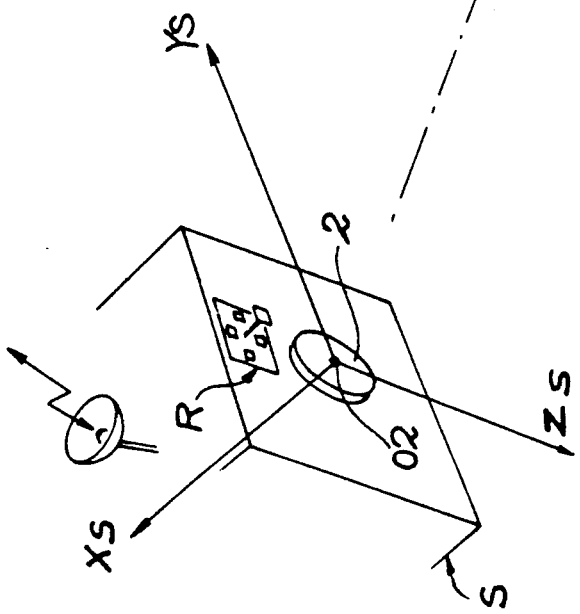

The invention is described in greater detail hereinafter relative to non-limitative embodiments and the attached drawings, wherein show:

FIG. 1—Diagrammatically two objects to be assembled by the relative displacement of one with respect to the other, by remotely controlling said assembly by using the process and system according to the invention.

FIG. 2—Diagrammatically two three axes references permitting a better understanding of the definition of the cardan angles.

Figure 3:
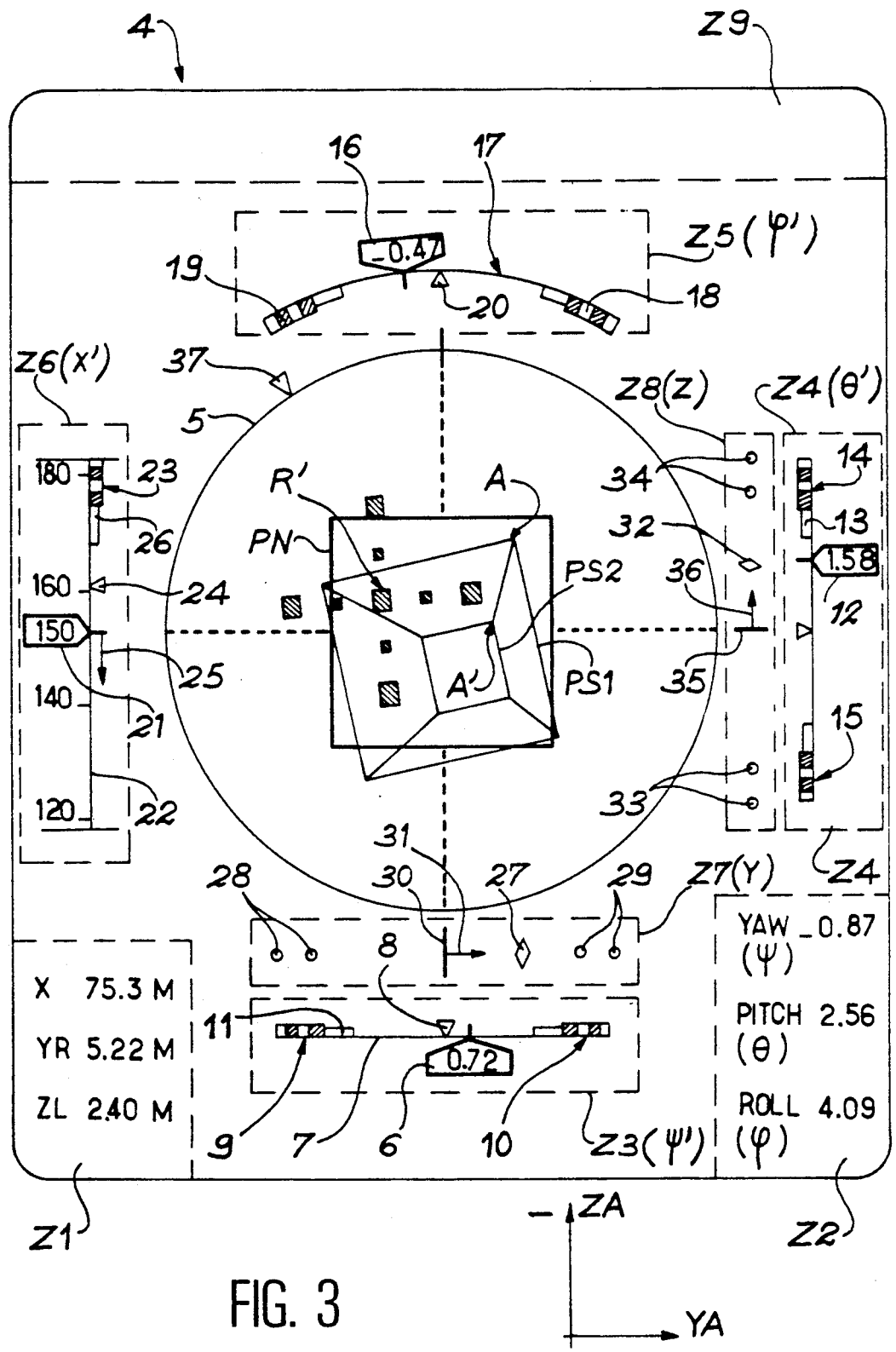

FIG. 3—Diagrammatically a display support on which appear information and figures making it possible to control the assembly of the two objects.

Figure 4:
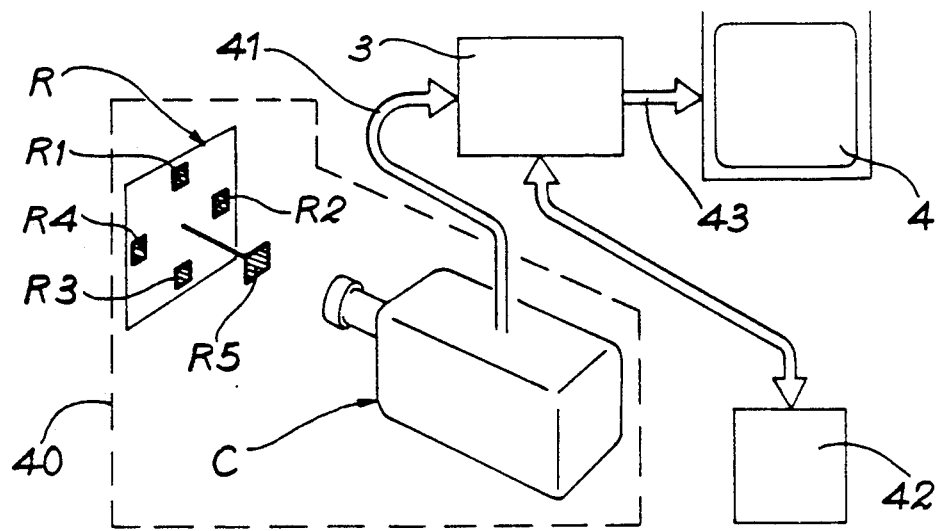

FIG. 4—Diagrammatically the system according to the invention.

Figure 5:
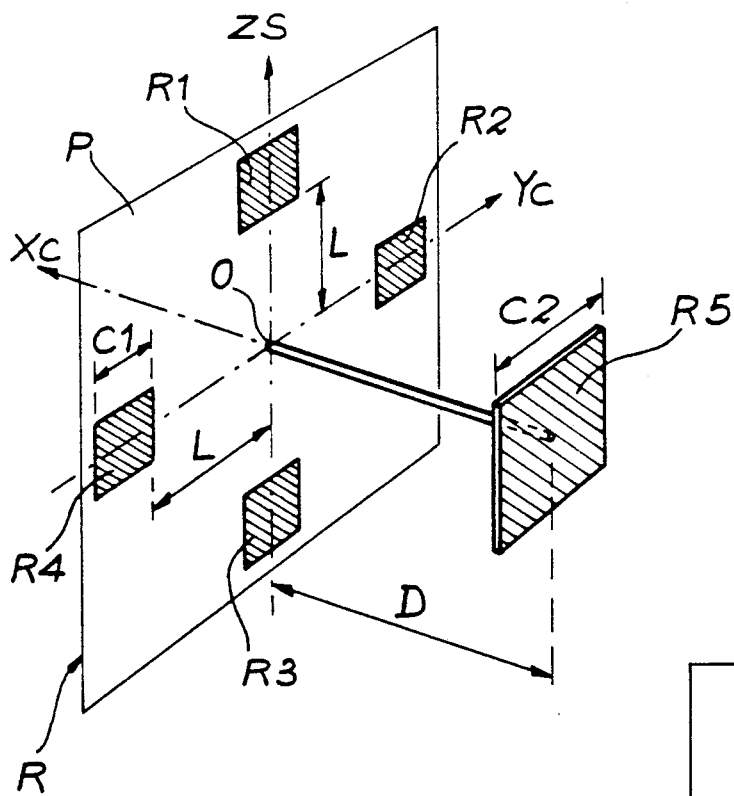

FIG. 5—Diagrammatically a target constituted by reflectors carried by one of the objects and used for checking the assembly of the two objects in accordance with the invention.

Figure 6:
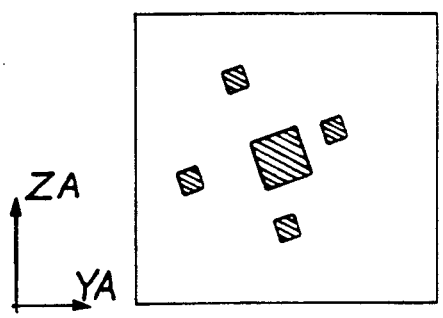

FIG. 6—A better understanding of the function of the reflector target according to the invention.

FIG. 1 diagrammatically shows two objects N and S, whereof it is desired to control their assembly. Their assembly is carried out by the control of a relative displacement of the first object N with respect to the second object S, making use of the controlling process and system according to the invention.

In the application described, it is assumed that the first object N is a space vehicle and that the second object S is an orbiting station. In other applications, e.g. robotics, the first object could be fixed to the end of an arm of a robot in order to be assembled with a second object independent of said arm.

FIG. 1 makes it easier to understand the invention when the latter is used in an orbiting rendez-vous. In this application, the first object or vehicle N has a first assembly or docking part 1, while the second object has a second assembly or docking part 2. These are the parts 1 and 2 which have to be assembled during the rendez-vous.

The description of the process and system according to the invention used for an orbiting rendez-vous remains valid for the assembly of two objects, one of which is carried by the mobile arm of a robot. In this case the control performed as a result of the invention makes it possible to act as a consequence thereof on the displacement control of the robot arm.

The relative displacement of the first object N with respect to the second object S, which permits the assembly of said two objects, is constituted by different movements. One of these movements is an approach movement by translation of the first object or vehicle N in the direction of the second object or station S. A second movement can be a lateral translation movement of the first object N relative to the second object S. Finally, another movement can be a rotary movement of the first object N relative to the second object S.

The process of the invention firstly consists of choosing a first three axes reference linked or associated with the first object N. This reference is defined by an origin $O_1$ and by three orthogonal axes $X_A$, $Y_A$, $Z_A$. A second three axes reference linked with the second object S is also chosen and defined by an origin $O_2$ and three orthogonal axes $X_S$, $Y_S$ and $Z_S$.

In the application of the invention to a rendez-vous in orbit, it is assumed that the relative position of the two objects is known by means of a known external system for calculating the relative and derived position. It is also assumed that when the control is carried out, the first object or space vehicle N is close to the second object or orbiting station S (approximately 100 meters) and that the space vehicle N has performed an appropriate reversal so that the first assembly part 1 is positioned facing the station S carrying the second assembly part 2, the assembly part 1 being at the rear of the vehicle in the represented embodiment.

The origin $O_1$ of the first reference is assumed to coincide with the center of gravity of the first assembly part 1, whilst the origin $O_2$ of the second reference is assumed to coincide with the center of gravity of the second assembly part 2.

It is also possible to see the control station, which in particular has control means P making it possible to act on the relative displacement of the first object N relative to the second object S. These control means are not described in detail here. This control station also has reception and processing means (not shown) enabling the pilot to know the relative position of his vehicle with respect to the station.

After defining the references described hereinbefore, the process then consists of determining, in the first reference ($O_1$, $X_A$, $Y_A$, $Z_A$) during the relative displacement of the first object N towards the second object S, instantaneous deviation values between the origin $O_2$ of the second reference ($O_2$, $X_S$, $Y_S$, $Z_S$) and the origin $O_1$ of the first reference. The process also consists of measuring the instantaneous cardan angle values, namely the roll, pitch and yaw angles, of the axes of the first reference ($X_A$, $Y_A$, $Z_A$) with respect to the corresponding axes ($X_S$, $Y_S$, $Z_S$) of the second reference, it being assumed that the origins $O_1$ and $O_2$ of the two references coincide. These cardan or gimbal angles will not be defined in detail here because they are well known in the art and in particular in aeronautics and astronautics. However, FIG. 2 gives a diagrammatic representation thereof.

The yaw angle $\psi$ is the angle of rotation about the axis $Z_S$, which makes the axis $X_S$ of the second reference mark coincide with the projection of the axis $X_A$ of the first reference mark on the plane $X_S Y_S$. The pitch angle $\theta$ is the angle of rotation about the axis $Y_S$ making the projection of the axis $X_A$ of the first reference mark on the plane $X_S Y_S$ of the second reference coincide with the axis $X_A$. The roll angle $\phi$ is the angle of rotation about the axis $X_A$ of the first reference, which makes the projection of the axis $Y_A$ of the first reference on the plane $X_S Y_S$ of the second reference coincide with the axis $Y_A$.

As will be shown hereinafter, these different angles are determined by means of a camera C carried on the first object N and which is consequently linked with the first reference. The lens of the camera is focussed on a reflector target R carried by the second object and which is therefore linked with the second reference. The image obtained as a result of the video signals supplied on the outputs of the camera is analyzed and processed by the computer 3 which determines, as a result of a known processing program, the instantaneous values of the cardan angles of the axes of the second reference with respect to the corresponding axes of the first reference. This arrangement also makes it possible to measure the instantaneous values of the deviations between the origin $O_2$ of the second reference and the origin $O_1$ of the first. These deviations can either be lateral deviations of the second reference relative to the first, measured on the axes $X_A$, $Z_A$ of the first reference, or deviations giving the approach of the second reference relative to the first and measured on the axis $X_A$ of the first reference.

The process of the invention then consists of controlling, particularly through the knowledge of the instantaneous values of the deviations and the angles referred to hereinbefore, the positioning of the parts to be assembled so as to act as a consequence thereof on the displacement controls of the first object.

This control essentially consists of processing the instantaneous values of the deviations and the cardan angles, in order to display on a display support of display means 4 (a screen of a video display means in preferred manner), linked with the first object N, parameters and geometrical figures enabling the person or pilot controlling the remote assembly to act as a consequence thereof on the displacement controls of the first object N so as to ensure a perfect assembly. The geometrical figures displayed are obtained through the processing of the instantaneous values of the deviations and the cardan angles.

These geometrical figures are shown in FIG. 3, which also shows the essential controlling information appearing on the display support and described hereinafter.

The geometrical figures appearing on the display support consist of a first polygon PN fixed to the support and representing a fictional contour of the first assembly part 1 of the first object. This polygon is preferably a square centered on the origin of the axes $Y_A$, $Z_A$ of the first reference. The latter is displayed here in the form of broken lines. On said support is also displayed a marking circle or dot 5 centered on the origin of the axes $Y_A$, $Z_A$ of the first reference.

The geometrical figures also consist of a second polygon PS1, which moves on the display support and represents a fictional contour of the second assembly part 2 of the second object S. This second polygon has the same shape and size as the first polygon, preferably a square, its instantaneous orientation and position being dependent on the instantaneous values of the cardan angles $\psi$, $\theta$, $\phi$.

The geometrical figures appearing on the display support also have a third polygon PS2, which is inside and homothetic of the second polygon PS1, having the same orientation as said second polygon. This third polygon (preferably a square) moves within the second polygon and occupies therein a position which is dependent on the lateral deviations (measured on the axes $X_A$, $Z_A$ of the first reference) of the second object S relative to the first object N. The processing operations making it possible to display these three polygons are not described in detail here. Thus, it falls within the scope of the Expert to display such polygons when their respective dimensions have been defined and their positions and orientations are known as a result of the prior knowledge of the instantaneous values of the deviations and the cardan angles.

The assembly control on the basis of the display of these polygons makes it possible to act on the displacement controls P of the first object N, so as to obtain on the display support the superimposing of the second polygon PS1 with the first polygon PN and the centering of the polygon PS2 within the second polygon PS1. Thus, when said superimposing and centering are perfectly obtained, i.e. the axes $X_A$ and $X_S$ of the first and second references coincide, and the axes $Y_A$, $Z_A$ of the first reference and the axes $Y_S$, $Z_S$ of the second reference respectively have the same orientation. When the assembly has taken place, all the axes of the first reference coincide with all the corresponding axes of the second reference.

In the embodiment shown in the drawing, the cardan angles have nonzero values and there are large lateral deviations. The leftward inclination of the second polygon with respect to the first indicates a large roll angle. Within the second polygon PS1, the third polygon PS2 occupies a downwardly and rightward displaced position. This displacement indicates that the first object N is located too far to the right and bottom with respect to the first object when considered in the direction thereof.

In order to better display the position of the third polygon PS2 within the second polygon PS1 and in order to give to the overall view an intuitively interpretable stylized perspective image, it is also possible to reveal on the display support segments such as AA' connecting each apex such as A of the second polygon PS2 to the corresponding apex A' of the third polygon PS1. When these polygons are squares, as in the embodiment shown in the drawing, the four segments such as AA' have equal length, when the square PS2 is perfectly centred in the square PS1.

In order to make it possible to more easily distinguish these different polygons, it is possible to control the display means in known manner, so as to display these polygons in different colours. Thus, the first polygon PN (which can be called the "vehicle mock-up") can be in yellow, whilst the second and third polygons PS1, PS2 (which can be called the "object mock-up") can be in blue. The Expert can readily obtain these colours.

The lateral deviations measured along the axes $Y_A$, $Z_A$ of the first reference, as well as the distance between the origin of the two references, measured along the axis $X_A$, can be displayed in one zone $Z_1$ of the display support. In the chosen embodiment, the distance X measured along the axis $X_A$ (X is 75.3 M) is equal to 75.3 m, whilst the lateral deviations, Y, Z, measured respectively along the axes $Y_A$, $Z_A$ (YR 5.22 M and ZL 2.40 M) are equal to 5.22 m and 2.40 m. For the lateral deviation Y, the letter R indicates that the first object is positioned to the right when considering said second object. If this first object was located to the left, the letter L would be used. For the lateral deviation Z, the letter L indicates that the first object is located towards the bottom compared with the second object. The letter H would indicate that the first object was at the top compared with the second object. It is obviously possible to choose different colours for the display of these parameters. For example, the letters X, Y, Z and M could be in white on a dark display screen, whilst the figures could be in green, together with the letters R, L and H indicating the positioning to the right, left, top or bottom of the first object compared with the second.

The values of the yaw angle $\psi$, the pitch angle $\theta$ and the roll angle $\phi$ are respectively displayed e.g. in a zone $Z_2$ of the display support, by the words YAW, PITCH and ROLL accompanied by the respective values of said angles. Thus, the yaw angle $\psi$ (indication YAW-0.87) has a negative value of 0.87°, whilst the pitch and roll angles respectively have values 2.56° and 4.09° (indications PITCH 2.56 and ROLL 4.09).

The two objects are perfectly assembled when the second polygon PS1 is precisely superimposed on the first polygon PN, the third polygon PS2 is accurately centered in the second polygon PS1, the yaw, pitch and roll angles (YAW, PITCH, ROLL) and the lateral deviations Y, Z and distance X all have zero values. The assembly check of the two objects makes it possible to act on the relative movement controls, so as to constantly seek during the approach of these two objects zero values for the cardan angles, lateral deviations, a superimposing of the first and second polygons and a very perfect centering of the third polygon in the second.

As hereinbefore, different colours can be chosen for the display of the cardan angle values. Thus, the words YAW, PITCH and ROLL can be displayed in white on a dark screen and the values of said angles can be displayed by green figures and symbols. It is within the scope of the Expert to obtain these colours in any display system.

Through the processing of the instantaneous values of the cardan angles, the inventive process also consists of displaying on the support of display means 4 values $\psi'$, $\theta'$, $\phi'$ of the instantaneous cardan angle variation speeds during the movement of the first object towards the second. The Expert can readily obtain instantaneous cardan angle variation speed values, because they are obtained by deriving the respective values of said angles relative to time. These cardan angle variation speed values are displayed in cursors moving relative to fixed scales.

For example, the variation speed $\psi'$ of the yaw angle is displayed in a zone $Z_3$ of the display support. The value of said speed (indication 0.72), equal to 0.72°/S in the example shown, is displayed in a cursor 6, which moves relative to a fixed scale 7. The center point of said scale is represented by a triangle 8 located in the extension of the axis $Z_A$ of the first reference. This scale has limit stops 9, 10 between which the cursor 6 must be located when the assembly operations are taking place normally. As in the preceding case, different display colours can be chosen in zone $Z_3$. For example, the cursor 6 is yellow, whilst the yaw speed value 0.72 is displayed in green. The limit stops have an alternation of white 9 and red 10 areas, as well as an amber extension 11. The triangle 8 materializing the centre point of the scale can be in white. The positioning of the cursor 6 to the right of the center point 8 in the scale e.g. indicates a tendency for the yaw speed to increase.

By using the same symbols and a similar colour code, the instantaneous values of the speed variation $\theta'$ of the pitch angle are displayed in a zone $Z_4$ of the display support. The cursor 12, in which is displayed the instantaneous value of the variation speed $\theta'$ of the pitch angle (indication 1.58), which is equal to 1.58°/S in the considered example, moves with respect to a fixed scale 13. The center point of said scale is materialized by a triangle 14 located in the extension of the axis $Y_A$ of the first reference between two end stops 14, 15.

Finally, the variation speed values of the roll angle $\phi'$ are displayed in a zone $Z_5$ of the display support. The colour codes chosen for said display are identical to those chosen for the display of the variation speed $\psi'$ and $\theta'$ of the yaw and pitch angles in zones $Z_3$, $Z_4$ described hereinbefore. The variation speed value $\phi'$ of the roll angle (indication $-0.47$), which is equal to $-0.47°/s$ in the considered example, is displayed in a cursor 16, which moves relative to a fixed scale 17, which has end stops 18, 19 and a center point designated by a triangle 20 located in the extension of the axis $Z_A$ of the first reference. The positioning of the cursor 16 to the left indicates a tendency towards a variation speed reduction of the roll angle.

The inventive process also consists of displaying, by the processing of instantaneous deviation values and in particular distance values between the origins of the two reference measured along the axis $X_A$ of the reference, the instantaneous speed values $X'$ for the approach of the first object to the second. This display is carried out in a zone $Z_6$ of the display support. The instantaneous approach speed value is displayed in a fixed cursor 21 (indication 150), e.g. 150 mm/s, with respect to a moving value scale 22. On said scale is displayed a limit stop 23 and a triangle 24 e.g. representing a pointer indicating approach speed instructions. The process consists of displaying in said same zone $Z_6$ the e.g. 10 second prediction of the approach speed, said tendency being indicated by a reticle of size proportional to $dx/d_t$. This symbol is here an upwardly or downwardly directed arrow 25. In the represented example, the arrow 25 is directed downwards and consequently indicates a reduction in the approach speed of the two objects compared with the speed instructions.

As in the preceding cases, colour codes can be chosen for displaying the different symbols or figures. Thus, e.g. the stop 23 consists of an alternation of white and red zones, preceded by an amber indicator 26. The scale 22 and figures are white, whilst the cursor 21 is yellow. The arrow 25 is green and the triangle 24 magenta.

Finally, according to the process of the invention, display respectively takes place by mobile cursors in fixed scales of the evolutions of the values of the transverse deviations Y, Z, respectively measured along the axes $Y_A$ and $Z_A$ of the first reference. By means of distinctive signs or symbols, a display also takes place of the predictions of these 10 second variations or deviations in a given direction.

For example, the evolutions of the deviations Y, measured along the axis $Y_A$ of the first reference, are displayed in a zone $Z_7$ by displacements of a lozenge-shaped cursor 27, moving with respect to a fixed scale defined by two limit stops 28, 29. Each of these stops is represented by two circles. The center point of said scale is represented by a segment 30 located in the extension of the axis $Z_A$ of the first reference. A distinctive symbol, e.g. the arrow 31, represents the 10 second prediction of the evolution of the transverse deviation Y in a given direction. In the represented example, the evolution tendency of said transverse deviation is to the right.

As for the display of the preceding parameters, colour codes can be chosen. Thus, the limit stops 28, 29 can e.g. be in white, the segment 30 in yellow, the arrow 31 in green and the lozenge 27 in magenta.

In the same way, the transverse deviation Z measured along the axis $Z_A$ of the first reference and the tendency of said deviation to evolve in a given direction are displayed in a zone $Z_8$ of the display screen by adopting a colour code similar to that chosen in zone $Z_7$. In this example, the lozenge 32 is positioned above the segment 35 materializing the center point of the scale and the deviation tendency indication arrow 36 points upwards. This means that the deviations measured along the axis $Z_A$ of the reference are negative and that their tendency has an upward evolution.

The circle or dot 5 can be white, whilst the broken lines materializing the axes $Y_A$, $Z_A$ of the first reference can be yellow.

Finally, a magenta triangle 37 directed along a radius of circle 5 completes the display by indicating by movement along said circle the evolution of the values of the roll angle $\phi$.

As will be shown hereinafter, this display is completed by the image $R'$ of the reflecting screen or reflector R supplied by the camera C. This image is superimposed on the different polygons described hereinbefore and enables the person or pilot responsible for checking the assembly of the two objects to e.g. establish that the orientation of the second and third polygons PS1, PS2 in the transverse plane $Y_A$, $Z_A$ (orientation of the second object relative to the first), is not aberrant with respect to the corresponding orientation of the image of the target of reflector R. The display can be completed in a zone $Z_9$ by different information useful to the pilot of the vehicle N or to the robot.

The following description relative to FIGS. 4 to 6 provides a better understanding of the structure of the system according to the invention.

FIG. 4 diagrammatically shows said system, which consists of measuring means 40 supplying in the first reference, on outputs 41, representative signals of instantaneous deviation and cardan angle values of the second reference with respect to the first.

These measuring means 40 incorporate a characteristic target R of reflectors $R_1$, $R_2$, $R_3$, $R_4$ and $R_5$. This target is integral with the second object, i.e. the orbiting station S in the chosen example. These measuring means 40 also have means C integral with the first object, i.e. the space vehicle N, which supply on outputs 41 signals representing the image of the target R, deviations and cardan angles defined hereinbefore. These means C are preferably constituted by a video camera, e.g. of the CCD type.

The system also has a computer 3 carried by the vehicle N. This computer is connected to the outputs 41 of the measuring means 40, as well as to a memory 42. The latter makes it possible to record measuring parameter values, processing parameter values and the programs necessary for said processing operations.

The computer makes it possible to process the signals representing the instantaneous deviation and angle values defined hereinbefore in order to obtain said values, as well as other values defined hereinbefore and makes it possible to check the displacement for the assembly of the first and second objects N, S respectively.

Finally, the system has coloured display means 4, preferably a liquid crystal or cathode display screen. These display means are connected to control outputs 43 of the computer 3. They make it possible to display the different check figures and information described relative to FIG. 3.

FIG. 5 diagrammatically shows in perspective a target R of reflectors $R_1$, $R_2$, $R_3$, $R_4$, $R_5$, which are e.g. identical, square and of size C1. The reflectors $R_1$ and $R_3$ are located on the axis $Z_S$ of the second reference, whilst reflectors $R_2$ and $R_4$ are located on an axis $Y_C$ parallel to the axis $Y_S$ of the reference. All these reflectors are located in the plane $Y_S$, $Z_S$ of the second reference and are equidistant L of the origin O of the reference (O, $Y_C$, $Z_S$).

The reflector $R_5$ is upstream of the plane defined by the axes $Y_C$ and $Z_S$ at a distance D from said plane. It also has an e.g. square shape and a size C2, which is larger than C1.

The camera C is oriented in accordance with the axis $X_A$ of the first reference linked with the vehicle. As a function of the distance of said camera from the second reference and its orientation relative to the axes of said second reference, the positions, orientations and dimensions of the images of said reflectors in the plane ($Y_A$, $Z_A$) of the first reference vary, as is diagrammatically shown in FIG. 6. The latter is an example of the image of the target obtained on the screen of the display means 4. The analysis and processing of said image by the computer 3 make it possible to determine, in known manner, the instantaneous deviation and angle values referred to hereinbefore.

On the display support 4, the displayed analog informations moved by deviations, have displacements calculated, not as a function of real deviations, but by dividing each of these deviations by the maximum deviation allowed for each of them. This maximum deviation varies as a function of the distance between the first object and the second object, in order to ensure an increasing accuracy in the display of the moving informations. Thus, an angular deviation of a cardan angle of e.g. 5 degrees, when the first object is at 100 m from the second object, leads to a large displacement of the second and third polygons (PS1, PS2) on screen 4, whilst an equally large displacement is caused by a deviation of only 0.5 degrees, when these two objects are at a distance of e.g. 5 m. The analog information moved in accordance with the deviations relate to the second and third polygons (PS1, PS2), the mobile cursors 27, 32 showing the evolutions of the instantaneous values of the transverse deviations Y,Z and the mobile cursors 12, 16 in which are inscribed the respective values of the variation speeds $\psi'$, $\theta'$, $\phi'$ of the cardan angles.

This increasing accuracy in the display of the moving analog information, particularly in the case of the assembly or docking of a space vehicle with an orbiting station, enables the pilot to act much more sensitively on the vehicle displacement controls.

Other information can be displayed on the display support, such as the respective validity ranges of the parameters X, X', Y, Y', etc. There can also be colour modifications, particularly in the display of the values of the deviations in order to indicate any passing beyond the validity limits of said values.

The invention makes it possible to achieve the objectives defined hereinbefore and in particular the remote control of the assembly of two objects, without direct vision thereof.

I claim:

1. Process for remotely controlling the assembling of a first object (N) and a second object (S), said assembling being carried out by controlling a relative displacement of the first object (N) relative to the second object (S), said displacement being an approach movement by translation of the first object in the direction of the second, a lateral translation movement of the first object with respect to the second and a rotary movement of the first object relative to the second, said object being respectively a first and a second assembly or docking parts (1, 2),
   first and second three axes references ($O_1$, $X_A$, $Y_A$, $Z_A$ and $O_2$, $X_S$, $Y_S$, $Z_S$) being linked respectively with said first and second objects (N, S), and each reference being defined by an origin and three orthogonal axes;
   the process comprising the steps of measuring in the first reference ($O_1$, $X_A$, $Y_A$, $Z_A$), during said relative displacement, instantaneous deviation values (X, Y, Z) between the origin ($O_2$) of the second reference and the origin ($O_1$) of the first reference and instantaneous values of cardan or gimbal angles ($\phi,\theta,\psi$), called roll, pitch and yaw angles, of the axes of the second reference with respect to the corresponding axes of the first reference;
   displaying from said instantaneous values, on a display support (4) linked with the first object (N), the instantaneous values of the deviations (X, Y, Z) and the cardan angles ($\phi,\theta,\psi$), and at least one first polygon (PN) fixed to said support, representing a fictional contour of said first assembly part (1), a second polygon (PS1) mobile on said support, representing a fictional contour of said second assembly part (2), said two polygons having the same shape and a similar size and the second polygon having an instantaneous position and orientation dependent on the corresponding instantaneous values of the cardan angles ($\phi,\theta,\psi$) of the second object relative to the first object, and a third polygon (PS2) inside and homothetic of the second polygon (PS1) and of the same orientation as said second polygon, said third polygon (PS2) being mobile within the second polygon (PS1) and occupying a position dependent on the lateral deviations (Y, Z) of the second object relative to the first object;
   controlling said relative displacement in order to bring about coincidence between the first and second polygons (PN, PS1) and in order to center the third polygon (PS2) in the second polygon (PS1), up to a zero value of said distance.

2. Process according to claim 1, further comprising a displaying on said display support (4) of instantaneous values ($\phi',\theta',\psi'$) of speed variations of cardan angles variations speeds during said displacement, from the instantaneous values.

3. Process according to claim 1, further comprising a displaying on said display support (4) of instantaneous approach speed values (X') of the first object (N) relative to the second object (S), from the instantaneous values of said deviations.

4. Process according to claim 3, further comprising a displaying by mobile cursors (27, 32) in fixed scales, of an increase or a decrease of the instantaneous values of the transverse deviations (Y, Z) and a displaying by distinctive symbols (31, 36), of evolution predictions relative to said deviations in a given direction.

5. Process according to claim 4, further comprising a respective displaying of the variation speed values ($\phi',\theta',\psi'$) of the cardan angles in cursors (6, 12, 16) moving relative to fixed scales.

6. Process according to claim 5, further comprising the selection of an increasing accuracy for calculating the displacements of the second and third polygons and cursors on the display support in the case of a decrease in the distance between the first and second objects.

7. Process according to claim 3, further comprising a displaying of the instantaneous approach speed values (X') in a cursor (21) which is fixed with respect to a moving value scale and a displaying of a prediction of an increase or a decrease of approach speed values by a distinctive symbol (25).

8. Process according to claim 1, wherein the first object (N) is fixed on an arm of a robot, the process being used for controlling the assembly of a first part (1) of the first object with a second part (2) of the second object.

9. Process according to claim 1, wherein the first part (1) of the first object (N) is a docking or assembly part of a space vehicle, the second part (2) of the second object (S) being a docking or assembly part of an orbiting space station, the process being used for controlling the space rendezvous between the vehicle and the station.

10. System for controlling the assembling of a first object (N) and a second object (S), said assembling being carried out by the control of a relative displacement of the first object relative to the second, said displacement being an approach movement of the first object in the direction of the second object, a lateral translation movement of the first object relative to the second and a rotary movement of the first object relative to the second, said objects respectively having a first and second assembly or docking parts (1, 2), this system comprising measuring means (40) for supplying in a first three axes reference ($O_1$, $X_A$, $Y_A$, $Z_A$) of the first object (N), during the displacement, signals representing the instantaneous values of deviations between the origin of the first reference ($O_2$, $X_S$, $Y_S$, $Z_S$) of the first object and the origin of a second three axes reference of the second object (S), and instantaneous values of cardan or gimbal angles ($\phi,\theta,\psi$), called roll, pitch and yaw angles, respectively between the axes of the second reference and the corresponding axes of the first reference, each three axes reference being defined by an origin and three orthogonal axes, the representative signals of the instantaneous values being supplied on outputs (41) of the measuring means (40); a computer (3) connected to a memory (42) and to the outputs (41) of the measuring means for processing the representative signals of the instantaneous values in order to obtain said instantaneous values and to permit said controlling of the movement of the first object (N) relative to the second (S);

display means (4) connected to the control outputs (43) of the computer (3) for displaying during the displacement, on the display support at least instantaneous values of the deviations (X, Y, Z) and the cardan angles ($\phi,\theta,\psi$), instantaneous values ($\phi',\theta',\psi'$) of speed variations of the cardan angles, instantaneous values of approach speeds (X) of the first object relative to the second object and for displaying at least one fixed polygon (PN) on the support representing a fictional contour of said first assembly part (1), a second polygon (PS1), mobile on the support, representing a fictional contour of said second assembly part (2), these two polygons having the same shape and size and the second polygon having an instantaneous position and orientation dependent on the corresponding instantaneous values of the cardan angles ($\phi,\theta,\psi$) of the second object relative to the first, and a third polygon (PS2), inside and homothetic of the second polygon (PS1) and having the same orientation as said second polygon, said third polygon being mobile within the second polygon and occupying a position dependent on lateral deviations of the second object relative to the first, the displacement of the first object relative to the second being controlled from the displaying of the polygons so that further to the displacement, to bring about coincidence of the first and second polygons and to center the third polygon in the second polygon up to a zero value of said distance.

11. System according to claim 10, wherein the measuring means (40) incorporates a characteristic target (R) of reflectors integral with the second object (S) and a means (C) integral with the first object (N) supplying on outputs (41) signals representing the target, cardan angles and distance deviations in the first reference.

12. System according to claim 11, wherein the means for supplying said representative signals comprises a video camera (C) supplying said signals on outputs (41).

13. System according to claim 12, wherein the display means (4) are visual display means, the target (R) being superimposed on the visual display with said first, second and third polygons (PN, PS1, PS2).

14. System according to claim 13, wherein the display means (4) comprise means for controlling displaying colors.

15. System according to claim 10, wherein the first object (N) is fixed on an arm of a robot, the system being used for controlling the assembly of a first part (1) of the first object with a second part (2) of the second object.

16. System according to claim 10, wherein the first part (1) of the first object (N) is a docking or assembly part of a space vehicle, the second part (2) of the second object (S) being a docking or assembly part of an orbiting space station, the system being used for controlling the space rendezvous between the vehicle and the station.

* * * * *